US008886818B2

(12) United States Patent
Kim et al.

(10) Patent No.: US 8,886,818 B2
(45) Date of Patent: Nov. 11, 2014

(54) SYSTEM AND METHOD FOR PROVIDING SERVICE TO END-POINT TERMINAL IN CPNS ENVIRONMENT, AND CPNS SERVER, MOBILE COMMUNICATION TERMINAL, AND END-POINT TERMINAL FOR THE SAME

(75) Inventors: In Hwan Kim, Seoul (KR); Jeong Hoon Lee, Seoul (KR); Jeong Min You, Seoul (KR)

(73) Assignee: SK Telecom Co., Ltd, Seoul (KR)

( * ) Notice: Subject to any disclaimer, the term of this patent is extended or adjusted under 35 U.S.C. 154(b) by 268 days.

(21) Appl. No.: 13/127,681

(22) PCT Filed: Oct. 30, 2009

(86) PCT No.: PCT/KR2009/006312
§ 371 (c)(1),
(2), (4) Date: May 4, 2011

(87) PCT Pub. No.: WO2010/053272
PCT Pub. Date: May 14, 2010

(65) Prior Publication Data
US 2011/0212689 A1      Sep. 1, 2011

(30) Foreign Application Priority Data
Nov. 4, 2008   (KR) .................. 10-2008-0109047

(51) Int. Cl.
*H04W 4/20* (2009.01)
*H04L 29/08* (2006.01)

(52) U.S. Cl.
CPC *H04L 67/16* (2013.01); *H04W 4/20* (2013.01)
USPC ........................................ 709/229

(58) Field of Classification Search
USPC .......................................... 455/41.1; 709/229
See application file for complete search history.

(56) References Cited

U.S. PATENT DOCUMENTS

| 8,094,647 | B2* | 1/2012 | Elliott et al. ................ 370/352 |
| 2004/0199212 | A1* | 10/2004 | Fischell et al. .................. 607/32 |
| 2004/0259589 | A1* | 12/2004 | Bahl et al. .................. 455/553.1 |
| 2006/0075242 | A1* | 4/2006 | Aissi et al. .................... 713/176 |

(Continued)

FOREIGN PATENT DOCUMENTS

| KR | 1020020041462 | 6/2002 |
| KR | 1020080087412 | 10/2008 |

OTHER PUBLICATIONS

WPAN Services Standardization Activities Nov. 2008.

(Continued)

*Primary Examiner* — Larry Donaghue
*Assistant Examiner* — Deforrest Bailey
(74) *Attorney, Agent, or Firm* — Baker Hostetler LLP

(57) ABSTRACT

The present invention relates to a system and a method for providing a service to an end-point terminal in a CPNS environment, and to a CPNS server, a mobile communication terminal and an end-point terminal for the same. The system comprises a CPNS server which performs an authentication procedure based on received terminal information about the mobile communication terminal and requests a content providing server to execute the CPNS mobile communication terminal for opening a CPNS session with the end-point terminal when the CPNS server provides the CPNS; and the end-point terminal requests the CPNS reservation from the mobile communication terminal or the CPNS server and executes the CPNS provided by the CPNS server via the mobile communication terminal.

10 Claims, 4 Drawing Sheets

(56) References Cited

U.S. PATENT DOCUMENTS

| | | | |
|---|---|---|---|
| 2006/0258289 A1* | 11/2006 | Dua | 455/41.3 |
| 2008/0107249 A1* | 5/2008 | Kim et al. | 379/93.03 |
| 2008/0113655 A1* | 5/2008 | Angelhag | 455/414.2 |
| 2008/0116847 A1* | 5/2008 | Loke et al. | 320/108 |
| 2009/0075584 A1* | 3/2009 | Jung et al. | 455/3.01 |
| 2009/0111378 A1* | 4/2009 | Sheynman et al. | 455/41.1 |
| 2009/0137219 A1* | 5/2009 | Williams | 455/214 |
| 2009/0164514 A1* | 6/2009 | Svendsen et al. | 707/104.1 |
| 2009/0305630 A1* | 12/2009 | Kuroda et al. | 455/41.1 |
| 2010/0293183 A1* | 11/2010 | Yaqub | 707/769 |
| 2011/0223861 A1* | 9/2011 | Lee et al. | 455/41.1 |

OTHER PUBLICATIONS

Converged Personal Network Service Requirements, Candidate Version 1.0, Nov. 17, 2009.

* cited by examiner

SYSTEM AND METHOD FOR PROVIDING SERVICE TO END-POINT TERMINAL IN CPNS ENVIRONMENT, AND CPNS SERVER, MOBILE COMMUNICATION TERMINAL, AND END-POINT TERMINAL FOR THE SAME

TECHNICAL FIELD

The present invention relates to a system and method for providing Converged Personal Network Service (CPNS) to an end-point terminal in a CPNS environment and a CPNS server, a mobile communication terminal, and an end-point terminal for the same, and, more particularly, to a system and method for providing CPNS to an end-point terminal in a CPNS environment in which a server or a mobile communication terminal for providing CPNS performs an initialization operation and provides the CPNS to the end-point terminal.

BACKGROUND ART

With the development of information communication technology, a variety of end-point terminals, such as MPeg audio layer-3 (MP3) players, Personal Multimedia Players (PMPs), and Ultra Mobile Personal Computers (UMPCs) capable of playing document, images, and moving images, are being used.

A user downloads desired content to the end-point terminal from a Personal Computer (PC) and uses the downloaded content. There is a problem in that a user cannot download desired content in a situation where the user moves or cannot access a PC.

In order to solve the problem, there was proposed technology in which communication means connectable to a near field communication network, such as Bluetooth or Ultra WideBand (UWB), is added to the end-point terminal.

According to the technology, content can be downloaded from an external device over a near field radio communication network. This method may be used to download content stored in an external device. However, the method is problematic in that content desired by a user, but not stored in an external device cannot be downloaded.

Furthermore, although near field radio communication is used, a mobile communication terminal cannot be directly provided with content or service, previously provided by a service provider or a mobile communication company, using the existing cellular communication.

DISCLOSURE

Technical Problem

To solve the above problems, the present invention proposes CPNS technology in which an end-point terminal, such as a PMP, is connected to a mobile communication terminal through near field radio communication and desired CPNS can be received in such as way as to access the existing content service provider using the cellular communication function of the mobile communication terminal.

Meanwhile, in order for an end-point terminal to be provided with CPNS through a mobile communication terminal in a CPNS environment, there is a difficulty in that the end-point terminal must attempt access to the mobile communication terminal at a specific point of time and request desired CPNS from the mobile communication terminal.

The present invention has been made in view of the above problems occurring in the prior art, and an object of the present invention is to provide a system and method for providing CPNS to an end-point terminal in a CPNS environment and a CPNS server, a mobile communication terminal, and an end-point terminal for the same, wherein although an end-point terminal does not request CPNS from a mobile communication terminal in a CPNS environment, a server or the mobile communication terminal first performs an initialization operation for the CPNS when a preset time is reached.

Furthermore, according to another object of the present invention, a content provider or a CPNS server performs an initialization operation according to the needs of an operator, drives the application of an end-point terminal, and then provides CPNS.

Technical Solution

To achieve the above objects, according to an aspect of the present invention, there is provided a system for providing Converged Personal Network Service (CPNS) to an end-point terminal in a CPNS environment, including a CPNS server for receiving pieces of terminal information about a mobile communication terminal and the end-point terminal from the mobile communication terminal, performing a certification procedure for the end-point terminal based on the received terminal information, and requesting a content providing server to execute the CPNS so that content is provided; the mobile communication terminal for, when a set time is reached after the end-point terminal sets CPNS reservation, searching for the end-point terminal, requesting the CPNS from the CPNS server by transmitting its own terminal information and the terminal information of the end-point terminal to the CPNS server, opening a CPNS session with the end-point terminal when the CPNS server provides the CPNS, and providing reserved CPNS to the end-point terminal; and the end-point terminal for requesting the CPNS reservation from the mobile communication terminal or the CPNS server, waking up an application in response to a command received from the mobile communication terminal when the set time is reached, and executing the CPNS provided by the CPNS server via the mobile communication terminal.

It is preferred that in the case where the CPNS server receives a CPNS reservation request from the end-point terminal via the mobile communication terminal and sets the CPNS reservation, when the set time is reached, the CPNS server request the mobile communication terminal to search for the end-point terminal and transmit a certification information request to the end-point terminal.

A CPNS server according to another aspect of the present invention includes a communication interface unit for performing communication over a mobile communication network; a certification processing unit for performing a certification procedure based on pieces of terminal information about the mobile communication terminal and an end-point terminal received from the mobile communication terminal; a content request and reception unit for requesting reserved content from a content providing server and receiving the reserved content from the content providing server; a service providing unit for providing CPNS, including the reserved content, to the end-point terminal via the mobile communication terminal; and a database for storing information relevant to the CPNS server.

It is preferred that in the case where CPNS reservation be set in the CPNS server, the CPNS server further includes a reservation information registration unit for receiving a CPNS reservation request from the end-point terminal via the mobile communication terminal and setting the CPNS reservation. When the scheduled set time is reached, the certification processing unit requests a search for the end-point terminal and certification information from the mobile communication terminal.

It is preferred that the CPNS server further include a mobile communication terminal information management unit for registering the information of the mobile communication terminal, performing communication with the end-point terminal over a near field radio communication network, with the database, and managing the registered information.

It is preferred that the CPNS server further include an end-point terminal information management unit for registering the information of the end-point terminal, transmitting and receiving information to and from the mobile communication terminal over a near field radio communication network, with the database, and managing the registered information.

A mobile communication terminal according to yet another aspect of the present invention includes a wireless communication unit for performing communication over a mobile communication network or a near field radio communication network; a reservation information registration unit for receiving a CPNS reservation request from an end-point terminal and registering reservation information based on the CPNS reservation request; an end-point terminal search unit for searching for the end-point terminal which has requested the CPNS reservation when a scheduled set time is reached; a certification information processing unit for requesting certification and CPNS from a CPNS server by transmitting its own terminal information and terminal information of the end-point terminal, retrieved by the end-point terminal search unit, to the CPNS server; a session processing unit for, when the CPNS server provides the CPNS, opening a CPNS session with the end-point terminal in order to provide reserved CPNS to the end-point terminal; and a service providing unit for providing the reserved CPNS, received from the CPNS server, to the end-point terminal.

It is preferred that in the case where the CPNS reservation is set in the CPNS server, when a request for search for the end-point terminal and for a certification information request is received from the CPNS server, the end-point terminal search unit search for the end-point terminal.

According to still yet another aspect of the present invention, there is provided an end-point terminal for performing near field radio communication with a mobile communication terminal and receiving CPNS from a CPNS server via the mobile communication terminal, the end-point terminal. The end-point terminal includes a communication interface unit for performing communication over a near field radio communication network; a reservation request unit for registering CPNS reservation with the mobile communication terminal or the CPNS server in order to receive specific CPNS on a time set by a user; an application driving unit for waking up a relevant application in response to a command received from the mobile communication terminal in order to provide the specific CPNS; and a content request and reception unit for requesting content requested by the user by performing the near field radio communication with the mobile communication terminal.

According to still yet another aspect of the present invention, there is provided a method of providing CPNS to an end-point terminal in a system, comprising a CPNS server, a mobile communication terminal, and an end-point terminal, in a CPNS environment. The method includes the steps of (a) the mobile communication terminal receiving a CPNS reservation request from the end-point terminal and registering the CPNS reservation request; (b) when a scheduled set time is reached, the mobile communication terminal searching for the end-point terminal which has requested the CPNS reservation; (c) when terminal information about the retrieved end-point terminal is received, the mobile communication terminal requesting certification and service from the CPNS server by transmitting its own terminal information and the terminal information of the end-point terminal to the CPNS server; (d) the CPNS server performing a certification procedure based on the information received from the mobile communication terminal, requesting content, corresponding to reserved content, from a content providing server, receiving the requested content from the content providing server, and transmitting the received content to the mobile communication terminal; (e) when the CPNS server provides the CPNS, the mobile communication terminal opening a CPNS session with the end-point terminal in order to provide the reserved CPNS to the end-point terminal; and (f) the end-point terminal waking up an application in response to a command of the mobile communication terminal and executing CPNS information received from the mobile communication terminal.

According to still yet another aspect of the present invention, there is provided a method of providing CPNS to an end-point terminal in a system, comprising a CPNS server, a mobile communication terminal, and an end-point terminal, in a CPNS environment. The method includes the steps of (a) the CPNS server receiving a CPNS reservation request from the end-point terminal via the mobile communication terminal and registering the received CPNS reservation request; (b) when a scheduled set time is reached, the CPNS server requesting the mobile communication terminal to search for the end-point terminal which has requested the CPNS reservation and to return certification information to the CPNS server; (c) when terminal information is received from the retrieved end-point terminal, the mobile communication terminal requesting certification and service from the CPNS server by transmitting its own terminal information and the terminal information of the end-point terminal to the CPNS server; (d) the CPNS server performing a certification procedure based on the information received from the mobile communication terminal, requesting content, corresponding to reserved content, from the content providing server, receiving the requested content from the content providing server, and transmitting the received content to the mobile communication terminal; (e) when the CPNS server provides the CPNS, the mobile communication terminal opening a CPNS session with the end-point terminal in order to provide reserved CPNS to the end-point terminal; and (f) the end-point terminal waking up an application in response to a command of the mobile communication terminal and executing CPNS information received from the mobile communication terminal.

It is preferred that the step (a) include the step of the mobile communication terminal receiving the CPNS reservation request from the end-point terminal and registering the received CPNS reservation request.

Advantageous Effects

As described above, the system and method for providing CPNS to an end-point terminal in a CPNS environment, and the CPNS server, the mobile communication terminal, and the end-point terminal for the same according to the present invention may have an effect that, although an end-point terminal does not request CPNS from a mobile communication terminal in a CPNS environment, a server or the mobile communication terminal first performs an initialization operation for the CPNS when a preset time is reached.

Furthermore, the present invention is advantageous in that a content provider or a CPNS server first performs an initialization operation according to the needs of an operator, drives the application of an end-point terminal, and then provides CPNS.

DESCRIPTION OF REFERENCE NUMERALS OF PRINCIPAL ELEMENTS IN THE DRAWINGS

Figure 1:
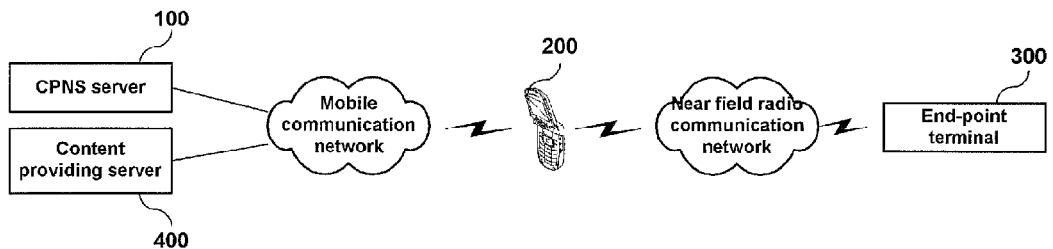
FIG. 1 is a diagram showing a connection between a system and a communication network according to according to the present invention.

100: CPNS server
170: service providing unit
110, 310: communication interface unit
120: mobile communication terminal information management unit
130: end-point terminal information management unit
140: reservation information registration unit
150: certification processing unit
180: database
160: content request and reception unit
200: mobile communication terminal 230: output unit
210: wireless communication unit
220, 320: input unit
240, 340: storage unit
250: reservation information registration unit
260: end-point terminal search unit
270: certification information processing unit
280: session processing unit
300: end-point terminal
290: service providing unit
330: play unit
350: reservation request unit
360: application driving unit
370: content request and reception unit
400: content providing server

MODE FOR INVENTION

In a CPNS environment disclosed in the present invention, a portable terminal which can perform only near field radio communication, but cannot perform cellular communication over a mobile communication network is enabled to employ data service that can be provided through cellular communication by performing near field radio communication with a mobile communication terminal which plays the role of a PN (Personal Network) service gateway.

Hereinafter, preferred embodiments the present invention are described in more detail with reference to the accompanying drawings.

FIG. 1 is a diagram showing a connection between a system and a communication network according to according to the present invention.

The system in which a server or a mobile communication terminal performs an initialization operation in a CPNS environment and provides CPNS to an end-point terminal includes a CPNS server 100, a mobile communication terminal 200, and an end-point terminal 300. The system is chiefly divided into a first case where CPNS reservation is set only in the mobile communication terminal 200 and a second case where CPNS reservation is set both in the mobile communication terminal 200 and the CPNS server 100.

The second case corresponds to a case where CPNS reservation is set in the CPNS server 100. The second case differs from the first case in that when a scheduled time is reached, the CPNS server 100 requests the mobile communication terminal 200 to search for an end-point terminal and requests certification information from the mobile communication terminal 200.

More particularly, the CPNS server 100 performs a certification procedure for a corresponding terminal on the basis of pieces of terminal information about the mobile communication terminal 200 and the end-point terminal 300, received from the mobile communication terminal 200, requests content from the content providing server 400, and executes CPNS.

In the case where the CPNS server 100 receives a CPNS reservation request from the end-point terminal 300 via the mobile communication terminal 200 and registers the CPNS reservation, when a set time is reached, the CPNS server 100 requests the mobile communication terminal 200 to search for an end-point terminal and transmits a certification information request to the mobile communication terminal 200.

After the CPNS reservation is set by the end-point terminal 300, the mobile communication terminal 200 searches for the end-point terminal 300 when a set time is reached and requests CPNS from the CPNS server 100 by transmitting its own terminal information and the terminal information of the end-point terminal 300 to the CPNS server 100. Next, when the requested CPNS is received from the CPNS server 100, the mobile communication terminal 200 opens a CPNS session with the end-point terminal 300 and provides reserved CPNS.

The end-point terminal 300 requests the CPNS reservation from the mobile communication terminal 200 or the CPNS server 100, wakes up a relevant application in response to a command received from the mobile communication terminal 200 when the set time is reached, and then executes the CPNS received from the CPNS server 100 via the mobile communication terminal 200.

The CPNS server 100 disclosed in FIG. 1 has the mobile communication terminal 200 and the end-point terminal 300 connected thereto, and it is assumed that the CPNS server 100 previously stores pieces of terminal information (for example, an LCD size and a codec) about the end-point terminal 300.

The end-point terminal 300 disclosed in FIG. 1 refers to a portable terminal equipped with a near field radio communication function, such as a personal multimedia player (PMP), an MP3 Player, a navigator, a mobile phone, and a game machine.

Meanwhile, the near field radio communication network includes all communication networks enabling near field radio communication, such as WLAN, Bluetooth, and UWB (Ultra WideBand).

On the other hand, the CPNS server 100, the mobile communication terminal 200, and the end-point terminal 300 shown in FIG. 1 experience an initial setting process for CPNS, which is described later.

Figure 2:
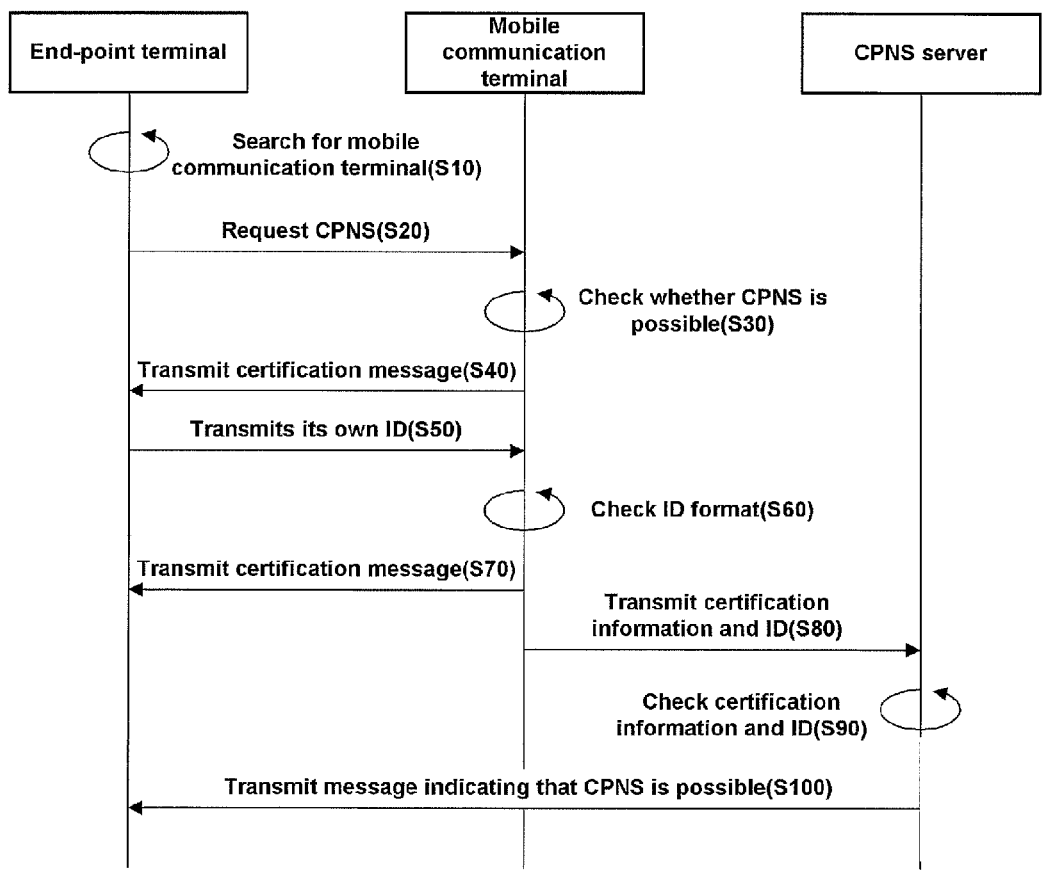
FIG. 2 is a flowchart illustrating an initial setting method for CPNS according to the present invention.

FIG. 2 is a flowchart illustrating an initial setting method for CPNS according to the present invention.

First, the end-point terminal 300 searches for a mobile communication terminal to play the role of a PN (Personal Network) Gateway Device in order to use CPNS at step S10.

Next, the end-point terminal 300 requests service from the mobile communication terminal 200 retrieved at step S10. Here, the end-point terminal also transmits information, indicating that CPNS is possible, to the mobile communication terminal 200 at step S20.

When the service request is received from the end-point terminal, the mobile communication terminal 200 checks whether the end-point terminal can use the CPNS at step S30.

If, as a result of the check at step S30, the end-point terminal can use the CPNS, the mobile communication terminal 200 transmits a certification message, indicating that the CPNS is available, to the end-point terminal 300 at step S40.

When the certification message indicating that the CPNS is available is received from the mobile communication terminal, the end-point terminal 300 transmits its own ID to the mobile communication terminal 200 at step S50.

The mobile communication terminal 300 confirms whether the format of the ID, received from the end-point terminal 200, is identical with the format of an ID issued by the CPNS at step S60. If, as a result of the confirmation, the format of the ID, received from the end-point terminal 200, is identical with the format of the ID issued by the CPNS, the mobile communication terminal 300 transmits a certification message, indicating that the service is possible, to the end-point terminal 300 at step S70.

Next, the mobile communication terminal 200 transmits its own certification information and ID and the certification information and ID of the end-point terminal 300 to the CPNS server 100 at step S80.

The CPNS server 100 determines whether the CPNS is available to the mobile communication terminal and the end-point terminal by confirming the pieces of certification information and the IDs received from the mobile communication terminal at step S90.

If, as a result of the determination, the CPNS is determined to be available to both the mobile communication terminal and the end-point terminal, the CPNS server 100 informs the end-point terminal of this fact so that the end-point terminal can perform the CPNS, including a request for content, at step S100.

If, as a result of the determination at step S90, the CPNS is determined not to be available to any one of the mobile communication terminal and the end-point terminal, the CPNS server 100 informs the end-point terminal of this fact and terminates the process.

Meanwhile, if, as a result of the check at step S30, the CPNS is not available to the end-point terminal, the mobile communication terminal 200 transmits a message, indicating that the service is not available, to the end-point terminal 300 and then terminates the process.

On the other hand, if, as a result of the confirmation at step S60, the format of the ID, received from the end-point terminal 200, is not identical with the format of the ID issued by the CPNS, the mobile communication terminal 300 transmits a message, indicating that the service is not available, to the end-point terminal 300 and then terminates the process.

Figure 3:
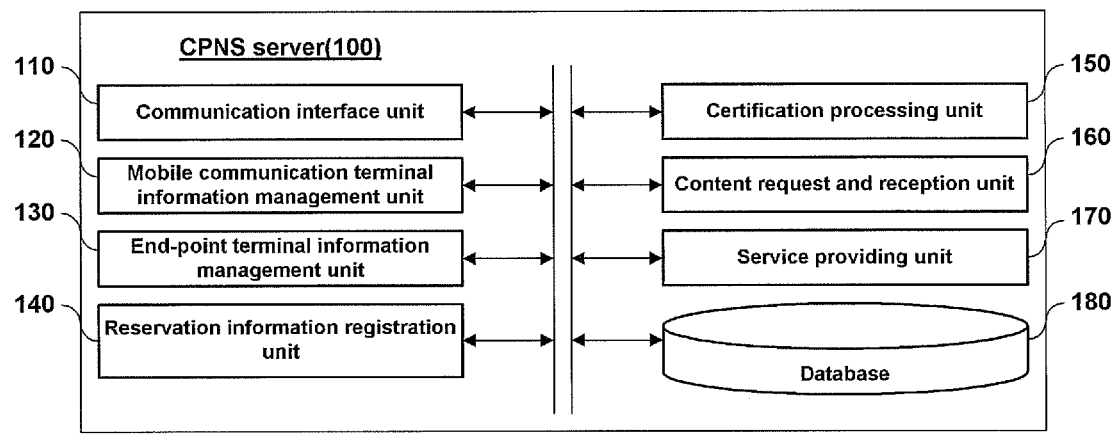
FIG. 3 is a diagram showing the configuration of a CPNS server according to the present invention.

FIG. 3 is a diagram showing the configuration of the CPNS server according to the present invention.

As shown, the CPNS server 100 includes a communication interface unit 110, a mobile communication terminal information management unit 120, an end-point terminal information management unit 130, a reservation information registration unit 140, a certification processing unit 150, a content request and reception unit 160, a service providing unit 170, and a database 180.

More particularly, the communication interface unit 110 is an element for performing communication over a mobile communication network.

The mobile communication terminal information management unit 120 registers information about the mobile communication terminal 200, performing communication with the end-point terminal 300 over a near field radio communication network, with the database 180 and manages the registered information.

The end-point terminal information management unit 130 registers information about the end-point terminal 300, transmitting and receiving information to and from the mobile communication terminal 200 over a near field radio communication network, with the database 180 and manages the registered information.

In the case where CPNS reservation is set in the CPNS server 100, the reservation information registration unit 140 receives a CPNS reservation request from the end-point terminal 300 via the mobile communication terminal 200 and sets CPNS reservation on the basis of the CPNS reservation request.

In the case where the CPNS reservation is registered with only the mobile communication terminal 200 not the reservation information registration unit 140 of the CPNS server 100, It is preferred that the reservation information registration unit 140 be omitted from the CPNS server 100.

The certification processing unit 150 performs a certification procedure on the basis of pieces of terminal information about the mobile communication terminal 200 and the end-point terminal 300 received from the mobile communication terminal 200.

In the case where CPNS reservation is registered with the CPNS server 100, when a scheduled set time is reached, the certification processing unit 150 requests a search for the end-point terminal 300 and certification information from the mobile communication terminal 200.

The content request and reception unit 160 requests reserved content from the content providing server 400 and receives the reserved content from the content providing server 400.

The service providing unit 170 provides the content and CPNS to the end-point terminal 300 via the mobile communication terminal 200.

The database 180 stores information relevant to the CPNS server 100.

Figure 4:
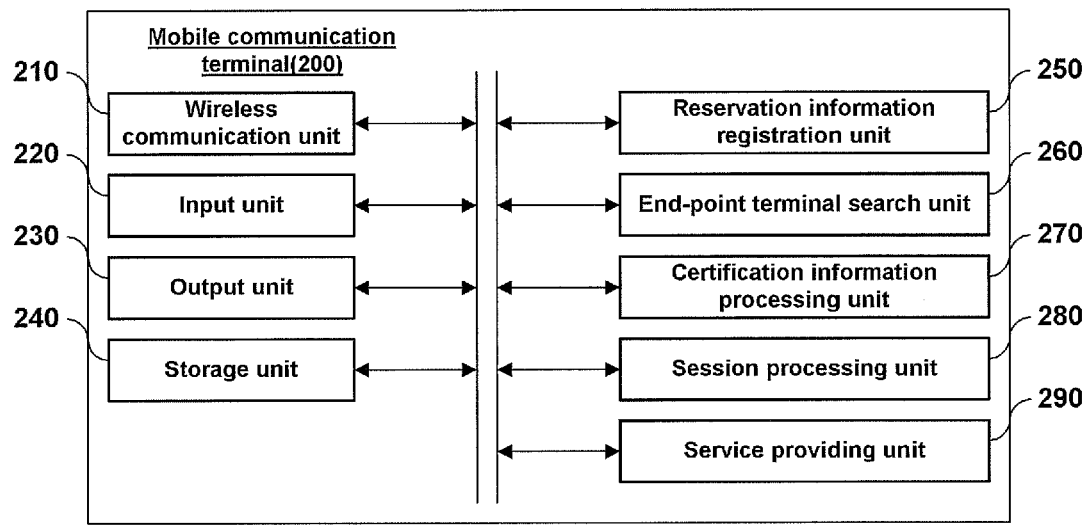
FIG. 4 is a diagram showing the configuration of a mobile communication terminal according to the present invention.

FIG. 4 is a diagram showing the configuration of the mobile communication terminal according to the present invention.

As shown, the mobile communication terminal 200 includes a wireless communication unit 210, an input unit 220, an output unit 230, a storage unit 240, a reservation information registration unit 250, an end-point terminal search unit 260, a certification information processing unit 270, a session processing unit 280, and a service providing unit 290.

More particularly, the wireless communication unit 210 is an element for performing communication over a mobile communication network or a near field radio communication network.

When a CPNS reservation request is received from the end-point terminal 300, the reservation information registration unit 250 registers CPNS reservation on the basis of the CPNS reservation request.

When a scheduled set time is reached, the end-point terminal search unit 260 searches for the end-point terminal which has requested the CPNS reservation.

In the case where the CPNS reservation is set in the CPNS server 100, when a request for a search for the end-point terminal 300 and for certification information is received from the CPNS server 100, the end-point terminal search unit 260 searches for the end-point terminal 300.

The certification information processing unit 270 requests certification and CPNS from the CPNS server 100 by transmitting its own terminal information and pieces of terminal information of the end-point terminal 300 retrieved by the end-point terminal search unit 260.

When the CPNS server 100 provides CPNS, the session processing unit 280 opens a CPNS session with the end-point terminal 300 to which the reserved CPNS will be provided.

The service providing unit 290 provides the end-point terminal 300 with the reserved CPNS received from the CPNS server 100.

Figure 5:
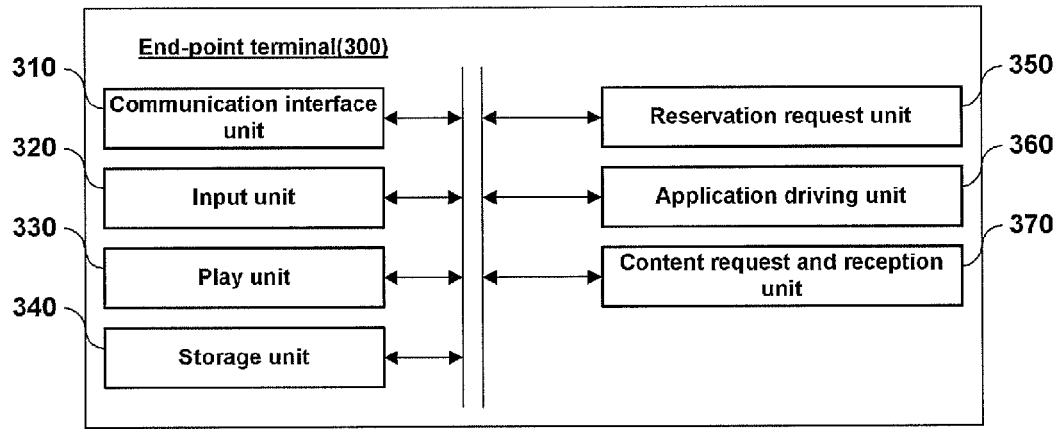
FIG. 5 is a diagram showing the configuration of an end-point terminal according to the present invention.

FIG. 5 is a diagram showing the configuration of the end-point terminal according to the present invention.

As shown, the end-point terminal 300 includes a communication interface unit 310, an input unit 320, a play unit 330, a storage unit 340, a reservation request unit 350, an application driving unit 360, and a content request and reception unit 370.

More particularly, the communication interface unit 310 is an element for performing communication over a near field radio communication network.

The input unit 320 receives a relevant signal according to user choice.

The play unit 330 executes information relevant to CPNS, including content provided by the CPNS server 100 through the mobile communication terminal 200. The information relevant CPNS may be stored in the mobile communication terminal 200 not the CPNS server 100.

The storage unit 340 stores information relevant to the end-point terminal 300.

The reservation request unit 350 registers CPNS reservation with the mobile communication terminal 200 or the CPNS server 100 so that specific CPNS can be provided on a time set by a user.

The application driving unit 360 wakes up a pertinent application in order to provide the specific CPNS in response to a command received from the mobile communication terminal 200.

The content request and reception unit 370 performs near field radio communication with the mobile communication terminal 200 and requests content, requested by the user, from the mobile communication terminal 200.

Figure 6:
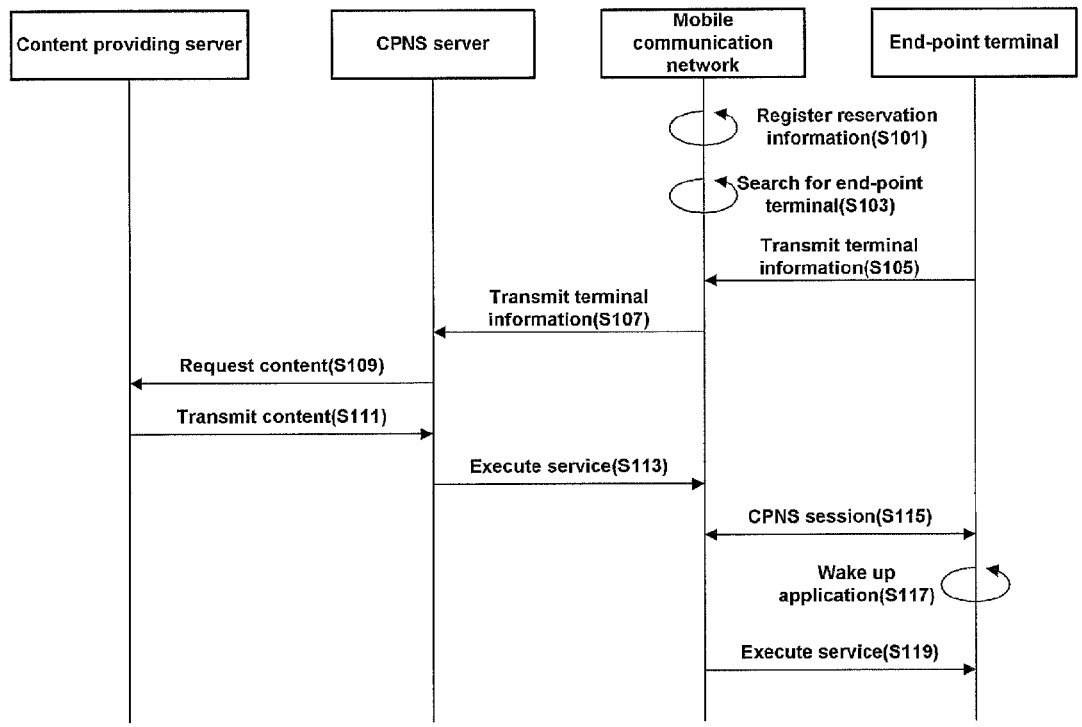
FIG. 6 is a flowchart illustrating an example of a method of providing CPNS to an end-point terminal in a CPNS environment according to the present invention.

FIG. 6 is a flowchart illustrating an example of a method of providing CPNS to the end-point terminal in a CPNS environment according to the present invention. A case where CPNS reservation is set in the mobile communication terminal 200 is described as an example.

First, the mobile communication terminal 200 receives a CPNS reservation request from the end-point terminal 300 and registers the CPNS reservation request at step S101.

When a scheduled set time is reached, the mobile communication terminal 200 searches for the end-point terminal 300 which has requested the CPNS reservation at step S103.

Next, when pieces of terminal information about the end-point terminal 300 retrieved at step S103 are received at step S105, the mobile communication terminal 200 requests certification and CPNS from the CPNS server 100 by transmitting its own terminal information and the terminal information of the end-point terminal 300 at step S107.

The CPNS server 100 performs a certification procedure on the basis of the information received from the mobile communication terminal 200, requests content, corresponding to reserved content, from the content providing server 400 at step S109, receives the requested content from the content providing server 400 at step S111, and transmits the received content to the mobile communication terminal 200 at step S113.

When the CPNS server provides the CPNS, the mobile communication terminal 200 opens a CPNS session with the end-point terminal 300 in order to provide the reserved CPNS to the end-point terminal 300 at step S115.

The end-point terminal 300 wakes up relevant application in response to a command received from the mobile communication terminal 200 at step S117 and executes the CPNS information received from the mobile communication terminal 200 at step S119.

Figure 7:
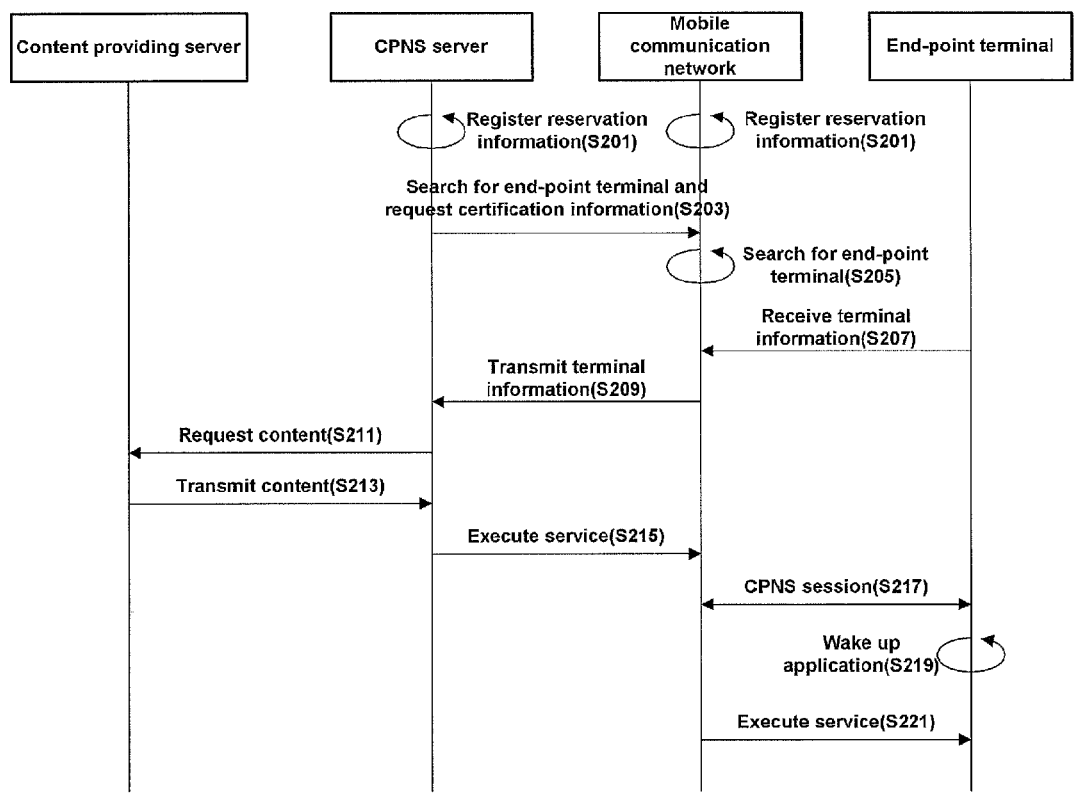
FIG. 7 is a flowchart illustrating another example of a method of providing CPNS to an end-point terminal in a CPNS environment according to the present invention.

FIG. 7 is a flowchart illustrating another example of a method of providing CPNS to the end-point terminal in a CPNS environment according to the present invention. A case where CPNS reservation is set in the mobile communication terminal 200 and the CPNS server 100 is described as an example.

First, the CPNS server 100 receives a CPNS reservation request from the end-point terminal 300 via the mobile communication terminal 200 and registers the CPNS reservation request at step S201.

Here, the mobile communication terminal 200 also receives the CPNS reservation request from the end-point terminal 300 and registers the CPNS reservation request.

When a scheduled set time is reached, the CPNS server 100 requests the mobile communication terminal 200 to search for the end-point terminal 300 which has requested the CPNS reservation and to return certification information thereto at step S203.

When terminal information is transmitted by the retrieved end-point terminal, the mobile communication terminal 200 requests certification and service from the CPNS server 100 by transmitting its own terminal information and the terminal information of the end-point terminal to the CPNS server 100 at steps S205 to S209.

After performing a certification procedure on the basis of the information received from the mobile communication terminal 200, the CPNS server 100 requests content, corresponding to reserved content, from the content providing server 400 at step S211, receives the requested content from the content providing server 400 at step S213, and transmits the received content to the mobile communication terminal 200 at step S215.

When the CPNS server 100 provides CPNS, the mobile communication terminal 200 opens a CPNS session with the end-point terminal 300 in order to provide the CPNS to the end-point terminal 300 at step S217.

The end-point terminal 300 wakes up a relevant application in response to a command received from the mobile communication terminal 200 at step S219 and executes CPNS information received from the mobile communication terminal 200 at step S221.

In the present invention, the case where the end-point terminal requests service reservations from the mobile communication terminal or the CPNS server has been described as an example. However, the present invention may be applied to technology in which a content provider or the CPNS server performs an initialization operation according to the needs of an operator, wakes up an application of an end-point terminal, and provides CPNS.

As described above, a person having ordinary skill in the art to which the present invention pertains will understand that the present invention may be implemented in various detailed forms without changing the technical spirit or indispensable characteristics of the present invention. It will be understood that the above-described embodiments are illustrative and not limitative from all aspects. The scope of the present invention is defined by the appended claims rather than the detailed description, and the present invention should be construed to cover all modifications or variations induced from the meaning and scope of the appended claims and their equivalents.

INDUSTRIAL APPLICABILITY

As described above, the system and method for providing CPNS to an end-point terminal in a CPNS environment, and the CPNS server, the mobile communication terminal, and the end-point terminal for the same according to the present invention are suitable to technology in which the CPNS server or the mobile communication terminal performs an initialization operation for CPNS when a preset time is reached although the end-point terminal does not request the CPNS from the mobile communication terminal in a CPNS environment.

The invention claimed is:

1. A system for providing Converged Personal Network Service (CPNS) to an end-point terminal in a CPNS environment, the system comprising:
a CPNS server for receiving pieces of terminal information about a mobile communication terminal and the end-point terminal from the mobile communication terminal using cellular communication, performing a certification procedure for the end-point terminal based on the received terminal information, and requesting a content providing server to execute the CPNS so that content is provided;
wherein the CPNS server is connected to the mobile communication terminal over the cellular communication network;
the mobile communication terminal for, when a set time is reached after the end-point terminal sets CPNS reservation, searching for the end-point terminal, requesting certification and the CPNS from the CPNS server by transmitting its own terminal information and the terminal information of the end-point terminal to the CPNS server, opening a CPNS session with the end-point terminal when the CPNS server provides the CPNS, and providing reserved CPNS to the end-point terminal;
wherein the mobile communication terminal is connected to the end-point terminal over the near-field communication network and to the CPNS server over a cellular communication network;
the end-point terminal requesting the CPNS reservation from the mobile communication terminal or from the CPNS server, and with the end-point terminal waking up an application in response to a command received from the mobile communication terminal when the set time is reached, and executing the CPNS provided by the CPNS server via the mobile communication terminal,
wherein the end-point terminal which cannot perform cellular communication, is connected to the mobile communication terminal over a near-field communication network,
wherein the content, which was received from the content providing server, is transmitted from the CPNS server to the end-point terminal via the cellular communication network, the mobile communication terminal and the near-field communication network in order and
wherein in a case where the CPNS server receives a CPNS reservation request from the end-point terminal via the mobile communication terminal and sets the CPNS reservation, when the set time is reached, the CPNS server requests the mobile communication terminal to search for the end-point terminal and transmits a certification information request to the end-point terminal.

2. A CPNS server, comprising:
a communication interface unit for performing communication over a mobile communication network;
a certification processing unit for performing a certification procedure based on pieces of terminal information about the mobile communication terminal and an end-point terminal received from the mobile communication terminal;
a content request and reception unit for requesting reserved content from a content providing server and receiving the reserved content from the content providing server;
a service providing unit for providing CPNS, including the reserved content, to the end-point terminal via the mobile communication terminal; and
a database for storing information relevant to the CPNS server,
wherein the CPNS server is connected to the mobile communication terminal over the cellular communication network,
wherein the end-point terminal which cannot perform cellular communication is connected to the mobile communication terminal over a near-field communication network,
wherein the content, which was received from the content providing server, is transmitted from the CPNS server to the end-point terminal via the cellular communication network, the mobile communication terminal and the near-field communication network in order and
wherein in a case where CPNS reservation is set in the CPNS server, the CPNS server further comprises a reservation information registration unit for receiving a CPNS reservation request from the end-point terminal via the mobile communication terminal and setting the CPNS reservation, and when the scheduled set time is reached, the certification processing unit requests a search for the end-point terminal and certification information from the mobile communication terminal.

3. The CPNS server according to claim 2, further comprising a mobile communication terminal information management unit for registering the information of the mobile communication terminal, performing communication with the end-point terminal over a near field radio communication network, with the database, and managing the registered information.

4. The CPNS server according to claim 2, further comprising an end-point terminal information management unit for registering the information of the end-point terminal, transmitting and receiving information to and from the mobile communication terminal over a near field radio communication network, with the database, and managing the registered information.

5. A mobile communication terminal, comprising:
a wireless communication unit for performing communication over a mobile communication network or a near field radio communication network;

a reservation information registration unit for receiving a CPNS reservation request from an end-point terminal and registering reservation information based on the CPNS reservation request;

an end-point terminal search unit for searching for the end-point terminal which has requested the CPNS reservation when a scheduled set time is reached and when the set time is reached, the CPNS server requests the mobile communication terminal to search for the end-point terminal and transmits a certification information request to the end-point terminal;

a certification information processing unit for requesting certification and CPNS from a CPNS server by transmitting its own terminal information and terminal information of the end-point terminal, retrieved by the end-point terminal search unit, to the CPNS server;

a session processing unit for, when the CPNS server provides the CPNS, opening a CPNS session with the end-point terminal in order to provide reserved CPNS to the end-point terminal; and a service providing unit for providing the reserved CPNS, received from the CPNS server, to the end-point terminal, wherein the CPNS server is connected to the mobile communication terminal over the cellular communication network, wherein the end-point terminal which cannot perform cellular communication is connected to the mobile communication terminal over a near-field communication network and wherein the content, which was received from the content providing server, is transmitted from the CPNS server to the end-point terminal via the cellular communication network, the mobile communication terminal and the near-field communication network in order.

6. The mobile communication terminal according to claim 5, wherein in a case where the CPNS reservation is set in the CPNS server, when a request for search for the end-point terminal and for a certification information request is received from the CPNS server, the end-point terminal search unit searches for the end-point terminal.

7. An end-point terminal for performing near field radio communication with a mobile communication terminal and receiving CPNS from a CPNS server via the mobile communication terminal, the end-point terminal, comprising:

a communication interface unit for performing communication over a near field radio communication network;

a reservation request unit for registering CPNS reservation with the mobile communication terminal or the CPNS server in order to receive specific CPNS on a time set by a user;

an application driving unit for waking up a relevant application in response to a command received from the mobile communication terminal in order to provide the specific CPNS; and a content request and reception unit for requesting content requested by the user by performing the near field radio communication with the mobile communication terminal, wherein the CPNS server is connected to the mobile communication terminal over the cellular communication network, wherein the end-point terminal which cannot perform cellular communication is connected to the mobile communication terminal over a near-field communication network, wherein the content, which was received from the content providing server, is transmitted from the CPNS server to the end-point terminal via the cellular communication network, the mobile communication terminal and the near-field communication network in order and wherein in a case where the CPNS server receives a CPNS reservation request from the end-point terminal via the mobile communication terminal and sets the CPNS reservation, when the set time is reached, the CPNS server requests the mobile communication terminal to search for the end-point terminal and transmits a certification information request to the end-point terminal.

8. A method of providing CPNS to an end-point terminal in a system, comprising a CPNS server, a mobile communication terminal, and an end-point terminal, in a CPNS environment, the method comprising the steps of:

(a) the mobile communication terminal receiving a CPNS reservation request from the end-point terminal and registering the CPNS reservation request;

(b) when a scheduled set time is reached, the mobile communication terminal searching for the end-point terminal which has requested the CPNS reservation;

(c) when terminal information about the retrieved end-point terminal is received, the mobile communication terminal requesting certification and service from the CPNS server by transmitting its own terminal information and the terminal information of the end-point terminal to the CPNS server;

(d) the CPNS server performing a certification procedure based on the information received from the mobile communication terminal, requesting content, corresponding to reserved content, from a content providing server, receiving the requested content from the content providing server, and transmitting the received content to the mobile communication terminal;

(e) when the CPNS server provides the CPNS, the mobile communication terminal opening a CPNS session with the end-point terminal in order to provide the reserved CPNS to the end-point terminal; and (f) the end-point terminal waking up an application in response to a command of the mobile communication terminal and executing CPNS information received from the mobile communication terminal, wherein the CPNS server is connected to the mobile communication terminal over the cellular communication network, wherein the end-point terminal which cannot perform cellular communication is connected to the mobile communication terminal over a near-field communication network wherein the content, which was received from the content providing server, is transmitted from the CPNS server to the end-point terminal via the cellular communication network, the mobile communication terminal and the near-field communication network in order and wherein in a case where the CPNS server receives a CPNS reservation request from the end-point terminal via the mobile communication terminal and sets the CPNS reservation, when the set time is reached, the CPNS server requests the mobile communication terminal to search for the end-point terminal and transmits a certification information request to the end-point terminal.

9. A method of providing CPNS to an end-point terminal in a system, comprising a CPNS server, a mobile communication terminal, and an end-point terminal, in a CPNS environment, the method comprising the steps of:

(a) the CPNS server receiving a CPNS reservation request from the end-point terminal via the mobile communication terminal and registering the received CPNS reservation request;
(b) when a scheduled set time is reached, the CPNS server requesting the mobile communication terminal to search for the end-point terminal which has requested the CPNS reservation and to return certification information to the CPNS server;
(c) when terminal information is received from the retrieved end-point terminal, the mobile communication terminal requesting certification and service from the CPNS server by transmitting its own terminal information and the terminal information of the end-point terminal to the CPNS server;
(d) the CPNS server performing a certification procedure based on the information received from the mobile communication terminal, requesting content, corresponding to reserved content, from the content providing server, receiving the requested content from the content providing server, and transmitting the received content to the mobile communication terminal;
(e) when the CPNS server provides the CPNS, the mobile communication terminal opening a CPNS session with the end-point terminal in order to provide reserved CPNS to the end-point terminal; and
(f) the end-point terminal waking up an application in response to a command of the mobile communication terminal and executing CPNS information received from the mobile communication terminal,
wherein the CPNS server is connected to the mobile communication terminal over the cellular communication network,
wherein the end-point terminal which cannot perform cellular communication is connected to the mobile communication terminal over a near-field communication network,
wherein the content, which was received from the content providing server, is transmitted from the CPNS server to the end-point terminal via the cellular communication network, the mobile communication terminal and the near-field communication network in order and
wherein in a case where the CPNS server receives a CPNS reservation request from the end-point terminal via the mobile communication terminal and sets the CPNS reservation, when the set time is reached, the CPNS server requests the mobile communication terminal to search for the end-point terminal and transmits a certification information request to the end-point terminal.

10. The method according to claim 9, wherein the step (a) comprises the step of the mobile communication terminal receiving the CPNS reservation request from the end-point terminal and registering the received CPNS reservation request.

* * * * *